United States Patent
He et al.

(10) Patent No.: US 12,483,709 B2
(45) Date of Patent: Nov. 25, 2025

(54) INTELLIGENT ENCODING METHOD AND SYSTEM, AND ELECTRONIC DEVICE

(71) Applicant: Rockchip Electronics Co., Ltd., Fuzhou (CN)

(72) Inventors: Delong He, Fuzhou (CN); Zhichao Yu, Fuzhou (CN); Yongzhen Yu, Fuzhou (CN); Zhihua Wang, Fuzhou (CN)

(73) Assignee: Rockchip Electronics Co., Ltd., Fujian (CN)

( * ) Notice: Subject to any disclaimer, the term of this patent is extended or adjusted under 35 U.S.C. 154(b) by 69 days.

(21) Appl. No.: 18/506,109

(22) Filed: Nov. 9, 2023

(65) Prior Publication Data

US 2024/0171751 A1  May 23, 2024

(51) Int. Cl.
*H04N 19/146* (2014.01)
*H04N 19/184* (2014.01)

(52) U.S. Cl.
CPC ......... *H04N 19/146* (2014.11); *H04N 19/184* (2014.11)

(58) Field of Classification Search
CPC .. H04N 19/146; H04N 19/184; H04N 19/115; H04N 19/124; H04N 19/14; H04N 19/167; H04N 19/17
See application file for complete search history.

(56) References Cited

U.S. PATENT DOCUMENTS

| | | | | |
|---|---|---|---|---|
| 2007/0002946 A1* | 1/2007 | Bouton | | H04N 19/162 |
| | | | | 375/E7.13 |
| 2009/0086816 A1* | 4/2009 | Leontaris | | H04N 19/14 |
| | | | | 375/E7.193 |
| 2018/0376153 A1* | 12/2018 | Gokhale | | H04N 19/147 |
| 2021/0160512 A1* | 5/2021 | Liu | | H04N 21/23655 |

FOREIGN PATENT DOCUMENTS

| | | | | |
|---|---|---|---|---|
| CN | 112004090 A | * | 11/2020 | ............... G06T 5/70 |
| WO | WO-2021188598 A1 | * | 9/2021 | ............. H04N 19/52 |

* cited by examiner

*Primary Examiner* — Tracy Y. Li
(74) *Attorney, Agent, or Firm* — IPRTOP LLC

(57) ABSTRACT

An intelligent encoding method, an intelligent encoding system, and an electronic device are provided. The intelligent encoding method comprises obtaining intelligent encoding information, wherein the intelligent encoding information comprises a maximum target bit rate, a minimum target bit rate, a motion complexity, a texture complexity, and a region of interest; and encoding an input source of an encoder based on the intelligent encoding information. The above intelligent encoding method has strong flexibility.

17 Claims, 2 Drawing Sheets

INTELLIGENT ENCODING METHOD AND SYSTEM, AND ELECTRONIC DEVICE

CROSS REFERENCE TO RELATED APPLICATION

The present application claims the benefit of priority to Chinese Patent Application No. CN 2022114480348, entitled "INTELLIGENT ENCODING METHOD AND SYSTEM, AND ELECTRONIC DEVICE", filed with CNIPA on Nov. 18, 2022, the disclosure of which is incorporated herein by reference in its entirety.

FIELD OF TECHNOLOGY

The present disclosure relates to the field of intelligent encoding technology, in particular, to an intelligent encoding method, an intelligent encoding system, and an electronic device.

BACKGROUND

As the Internet and video encoding technology continue to advance, online video is moving towards ultra-high resolution. While people enjoy high-quality video, they also face challenges such as higher bandwidth consumption and larger storage space required. To address these issues, intelligent encoding technology has emerged. Existing intelligent encoding schemes are often used in conjunction with other modes of bit rate control, such as constant bit rate (CBR) control and variable bit rate (VBR) control.

SUMMARY

The present disclosure provides an intelligent encoding method, an intelligent encoding system, and an electronic device for solving the problem that existing intelligent encoding technologies are not flexible enough.

A first aspect of the present disclosure provides an intelligent encoding method. The intelligent encoding method comprises: obtaining intelligent encoding information, wherein the intelligent encoding information comprises a maximum target bit rate, a minimum target bit rate, a motion complexity, a texture complexity, and a region of interest; and encoding an input source of an encoder based on the intelligent encoding information.

In an embodiment of the first aspect, encoding the input source of the encoder based on the intelligent encoding information comprises: configuring, based on the intelligent encoding information, at least one of a dynamic bit rate, a dynamic frame rate, a dynamic image group, and an effective protection area for the input source of the encoder.

In an embodiment of the first aspect, configuring the dynamic bit rate for the input source of the encoder based on the intelligent encoding information comprises: obtaining an encoding coefficient based on the motion complexity, the texture complexity and the region of interest, wherein the encoding coefficient is positively correlated with the motion complexity, the texture complexity, and a dimension of the region of interest; and configuring a target bit rate of the encoder based on the encoding coefficient, the maximum target bit rate, and the minimum target bit rate.

In an embodiment of the first aspect, configuring the target bit rate of the encoder based on the encoding coefficient, the maximum target bit rate, and the minimum target bit rate comprises: calculating and configuring the target bit rate of the encoder by using the following formula: target_bitrate=(max_bitrate−min_bitrate)×ratio+min_bitrate; wherein target_bitrate indicates the target bit rate of the encoder, max_bitrate indicates the maximum target bit rate, min_bitrate indicates the minimum target bit rate, and ratio indicates the encoding coefficient and ranges from 0 to 1.

In an embodiment of the first aspect, obtaining the encoding coefficient based on the motion complexity, the texture complexity and the region of interest comprises: obtaining the encoding coefficient from an encoding coefficient table, based on the motion complexity, the texture complexity and the region of interest.

In an embodiment of the first aspect, configuring the effective protection area for the input source of the encoder based on the intelligent encoding information comprises: detecting the region of interest from the input source of the encoder; and configuring an encoding mode of the region of interest as low-quantization parameter encoding.

In an embodiment of the first aspect, configuring the dynamic frame rate and the dynamic image group based on the intelligent encoding information comprises: configuring the dynamic frame rate and the dynamic image group based on the motion complexity and the texture complexity, wherein the lower the motion complexity is, the lower the dynamic frame rate is, and the longer the dynamic image group is, wherein the lower the texture complexity is, the lower the dynamic frame rate is, and the longer the dynamic image group is.

In an embodiment of the first aspect, obtaining the intelligent encoding information comprises: obtaining the maximum target bit rate and the minimum target bit rate based on a configuration instruction for bit rates input by a user.

A second aspect of the present disclosure provides an intelligent encoding system. The intelligent encoding system comprises: an encoding information obtaining device, configured to obtain intelligent encoding information comprising a maximum target bit rate, a minimum target bit rate, a motion complexity, a texture complexity, and a region of interest; and an encoder, configured to encode an input source based on the intelligent encoding information.

A third aspect of the present disclosure provides an electronic device. The electronic device comprises: a memory, configured to store a computer program; and a processor, configured to execute the computer program to implement an intelligent encoding method according to any one of the embodiments provided in the first aspect.

According to the intelligent encoding method of the present disclosure, the input source of the encoder can be intelligently encoded based on different scenarios. This makes the intelligent encoding method adaptable to different scenarios and highly flexible. For example, in a simple scenario, the bit rate is small; in a moderately complex scenario, the bit rate is moderate; and in a complex scenario, the bit rate is close to the maximum target bit rate. Additionally, compared to other bit rate control methods, the above intelligent encoding method can achieve better visual losslessness.

DETAILED DESCRIPTION

The embodiments of the present disclosure will be described below. Those skilled can easily understand disclosure advantages and effects of the present disclosure according to contents disclosed by the specification. The present disclosure can also be implemented or applied through other different specific embodiments. Various details in this specification can also be modified or changed based on different viewpoints and applications without departing from the spirit of the present disclosure. It should be noted that the following embodiments and the features of the following embodiments can be combined with each other if no conflict will result.

It should be noted that the drawings provided in this disclosure only illustrate the basic concept of the present disclosure in a schematic way, so the drawings only show the components closely related to the present disclosure. The drawings are not necessarily drawn according to the number, shape and size of the components in actual implementation; during the actual implementation, the type, quantity and proportion of each component can be changed as needed, and the components' layout may also be more complicated.

Existing intelligent encoding schemes are often used in conjunction with other modes of bit rate control, such as CBR control and VBR control. However, existing technology does not have a bit rate control scheme specifically designed for intelligent encoding. This lack of flexibility makes it difficult to test dynamic bit rates based on actual scene complexity and make flexible adjustments to compensate for insufficiency as perceived by human mind.

To address these issues, the present disclosure provides an intelligent encoding method that can intelligently encode the input source of an encoder based on different scenarios. This makes the encoding scheme of the input source flexible enough to suit different scenarios. Additionally, compared to other bit rate control methods, the above intelligent encoding method can achieve better visual losslessness.

The present disclosure will be described in further detail below with reference to the accompanying drawings.

Figure 1:
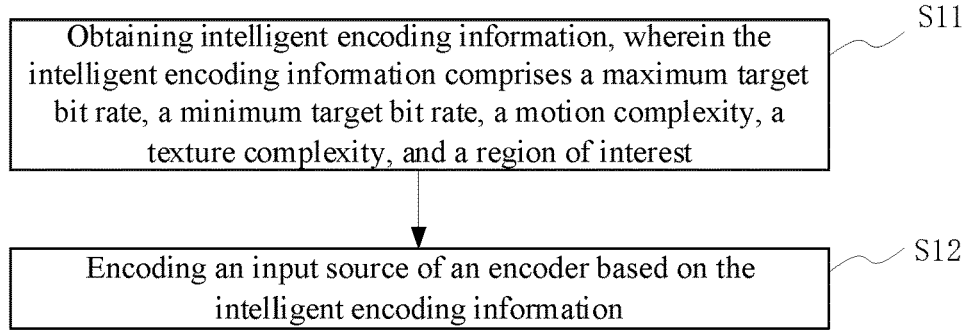
FIG. 1 shows a flowchart illustrating an intelligent encoding method according to an embodiment of the present disclosure.

FIG. 1 shows a flowchart illustrating an intelligent encoding method according to an embodiment of the present disclosure. As shown in FIG. 1, the intelligent encoding method comprises steps S11 and S12.

Step S11 includes obtaining intelligent encoding information, wherein the intelligent encoding information comprises a maximum target bit rate, a minimum target bit rate, a motion complexity, a texture complexity, and a region of interest (ROI). A bit rate refers to the number of data bits transmitted per unit time during data transmission, and its common unit is kbps.

Step S12 includes encoding an input source of an encoder based on the intelligent encoding information. In some embodiments, the method further comprises configuring, based on the intelligent encoding information, at least one of a dynamic bit rate, a dynamic frame rate, a dynamic image group, and an effective protection area for the input source of the encoder.

According to the present disclosure, the input source of the encoder can be intelligently encoded based on different scenarios. In a simple scenario, the bit rate is small; in a moderately complex scenario, the bit rate is moderate; and in a complex scenario, the bit rate is close to the maximum target bit rate. In this way, the encoding scheme is flexible enough to suit different scenarios.

Figure 2:
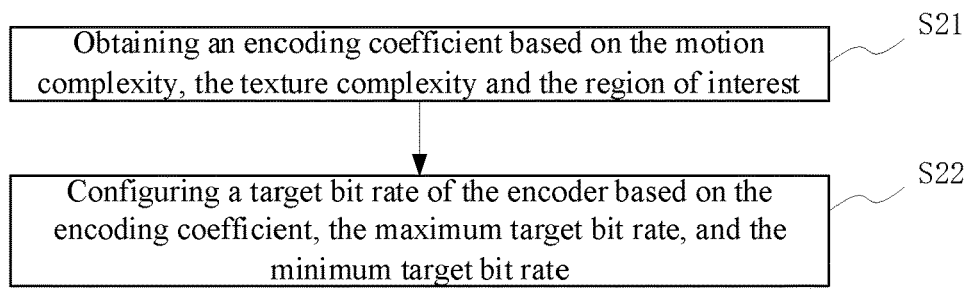
FIG. 2 shows a flowchart illustrating configuring a target bit rate of an encoder according to an embodiment of the present disclosure.

FIG. 2 shows a method for configuring, based on the intelligent encoding information, the dynamic bit rate for the input source of the encoder according to an embodiment of the present disclosure. As shown in FIG. 2, configuring the dynamic bit rate for the input source of the encoder based on the intelligent encoding information comprises steps S21 and S22.

Step S21 includes obtaining an encoding coefficient based on the motion complexity, the texture complexity and the region of interest, and the encoding coefficient is positively correlated with the motion complexity, the texture complexity, and a dimension of the region of interest. In some embodiments, the method further comprises obtaining the encoding coefficient from an encoding coefficient table, based on the motion complexity, the texture complexity and the region of interest. The encoding coefficient table may be obtained based on experiences or actual measurements, and comprise correspondence relationships between the encoding coefficient and the motion complexity, the texture complexity, and the dimension of the region of interest. The higher the motion complexity is, the higher the texture complexity is, the larger the dimension of the region of interest are, the larger the encoding coefficient corresponding to the encoding coefficient table is.

Step S22 includes configuring a target bit rate of the encoder based on the encoding coefficient, the maximum target bit rate, and the minimum target bit rate. In some embodiments, the method further comprises calculating and configuring the target bit rate of the encoder by using the following formula:

$$\text{target\_bitrate} = (\text{max\_bitrate} - \text{min\_bitrate}) \times \text{ratio} + \text{min\_bitrate};$$

wherein target_bitrate indicates the target bit rate of the encoder, max_bitrate indicates the maximum target bit rate, min_bitrate indicates the minimum target bit rate, and ratio indicates the encoding coefficient and ranges from 0 to 1.

It should be noted that, calculating and configuring the target bit rate of the encoder by using the above formula is merely illustrative, and the present disclosure is not limited thereto.

Figure 3:
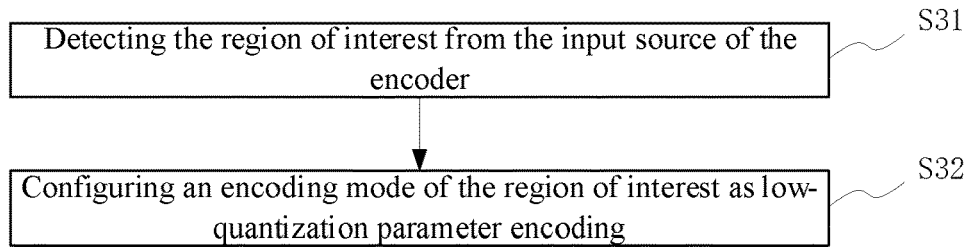
FIG. 3 shows a flowchart illustrating configuring an effective protection area for an input source of an encoder according to an embodiment of the present disclosure.

FIG. 3 shows a flowchart illustrating configuring the effective protection area for the input source of the encoder based on the intelligent encoding information. As shown in FIG. 3, configuring the effective protection area for the input source of the encoder based on the intelligent encoding information comprises steps S31 and S32.

Step S31 includes detecting the region of interest from the input source of the encoder. In some embodiments, the method further comprises detecting the region of interest from the input source of the encoder can be implemented by using artificial intelligence (AI) technologies. In some embodiments, the region of interest is a region of movement.

Step S32 includes configuring an encoding mode of the region of interest as low-quantization parameter encoding. The low-quantization parameter encoding means that the quantization parameter used for encoding the region of interest is smaller than that for a region of non-interest, rather than that the former has an absolute small value. This dichotomy can better preserve the image quality of the region of interest, thus making the region clearer, and effectively protecting the region of interest.

It should be noted that steps S31 and S32 are merely illustrative, and the present disclosure is not limited thereto. In certain specific applications, other technical means may be used to protect the region of interest.

In some embodiments, configuring the dynamic frame rate and the dynamic image group based on the intelligent encoding information comprises: configuring the dynamic frame rate and the dynamic image group based on the motion complexity and the texture complexity. The lower the motion complexity is, the lower the dynamic frame rate is, and the longer the dynamic image group is. The lower the texture complexity is, the lower the dynamic frame rate is, and the longer the dynamic image group is.

In one embodiment, obtaining the intelligent encoding information comprises: obtaining the maximum target bit rate and the minimum target bit rate based on a configuration instruction for bit rates input by a user.

The scope of the intelligent encoding method described in the present disclosure is not limited to the sequence of operations listed herein. Any scheme realized by adding or subtracting operations or replacing operations of the traditional techniques according to the principle of the present disclosure is included in the scope of the present disclosure.

According to the intelligent encoding method of the present disclosure, the input source of the encoder can be intelligently encoded based on different scenarios. This makes the intelligent encoding method adaptable to different scenarios and highly flexible. For example, in a simple scenario, the bit rate is small; in a moderately complex scenario, the bit rate is moderate; and in a complex scenario, the bit rate is close to the maximum target bit rate.

In addition, by configuring the encoding mode of the region of interest as low-quantization parameter encoding, the intelligent encoding method provided by the present disclosure can better preserve the image quality of the region of interest, thus making the region clearer, and effectively protecting the region of interest.

The present disclosure further provides an intelligent encoding system, which can implement the intelligent encoding method described in the present disclosure, but devices for implementing the intelligent encoding method described in the present disclosure are not limited to the intelligent encoding system as described in the present disclosure. Any structural adjustment or replacement of the prior art made according to the principles of the present disclosure is included in the scope of the present disclosure.

Figure 4:
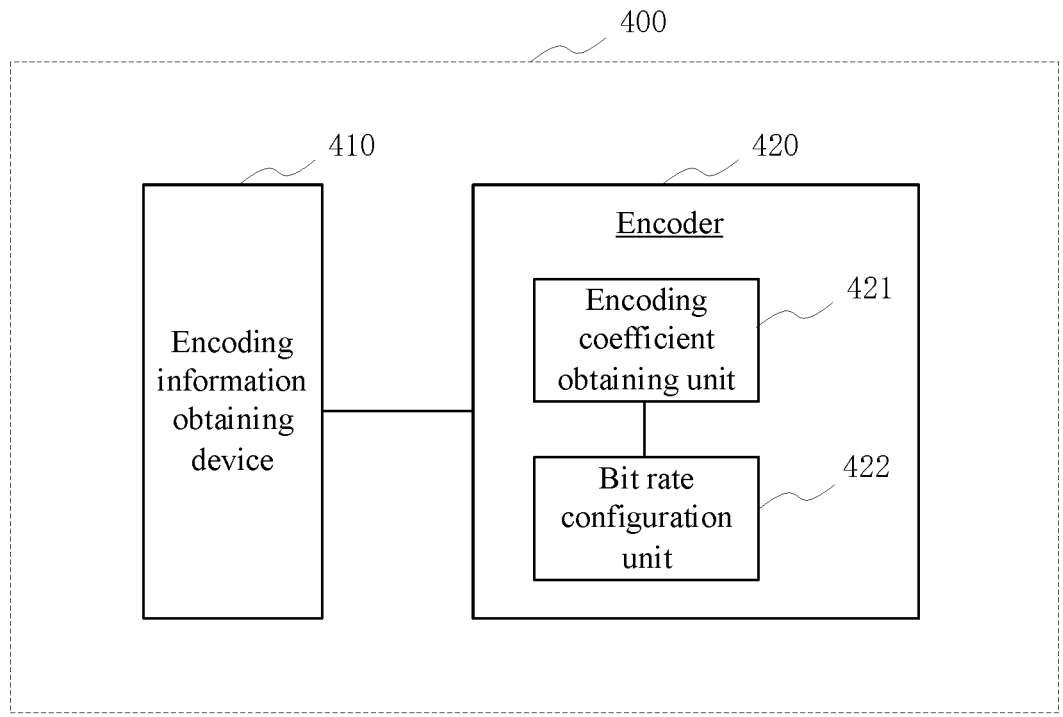
FIG. 4 shows a block diagram of an intelligent encoding system according to an embodiment of the present disclosure.

FIG. 4 shows a block diagram of an intelligent encoding system 400 according to an embodiment of the present disclosure. As shown in FIG. 4, the intelligent encoding system 400 comprises an encoding information obtaining device 410 and an encoder 420. The encoding information obtaining device 410 is configured to obtain intelligent encoding information. The intelligent encoding information comprises a maximum target bit rate, a minimum target bit rate, a motion complexity, a texture complexity, and a region of interest. The encoder 420 is coupled to the encoding information obtaining device 410 and configured to encode an input source based on the intelligent encoding information.

In some embodiments, the encoder 420 is configured to configure, based on the intelligent encoding information, at least one of a dynamic bit rate, a dynamic frame rate, a dynamic image group, and an effective protection area for the input source of the encoder.

In some embodiments, the encoder 420 comprises an encoding coefficient obtaining unit 421 and a bit rate configuration unit 422. The encoding coefficient obtaining unit 421 is configured to obtain an encoding coefficient based on the motion complexity, the texture complexity and the region of interest, and the encoding coefficient is positively correlated with the motion complexity, the texture complexity, and a dimension of the region of interest. The bit rate configuration unit 422 is configured to configure a target bit rate of the encoder based on the encoding coefficient, the maximum target bit rate, and the minimum target bit rate.

In some embodiments, the encoding coefficient obtaining unit 421 is configured to obtain the encoding coefficient from an encoding coefficient table, based on the motion complexity, the texture complexity and the region of interest.

In some embodiments, the bit rate configuration unit 422 is configured to calculate and configure the target bit rate of the encoder by using the following formula:

$$target\_bitrate=(max\_bitrate-min\_bitrate) \times ratio + min\_bitrate;$$

wherein target_bitrate indicates the target bit rate of the encoder, max_bitrate indicates the maximum target bit rate, min_bitrate indicates the minimum target bit rate, and ratio indicates the encoding coefficient and ranges from 0 to 1.

In some embodiments, the encoder 420 is configured to detect the region of interest from the input source of the encoder; and configure an encoding mode of the region of interest as low-quantization parameter encoding.

In some embodiments, the encoder 420 is configured to configure the dynamic frame rate and the dynamic image group based on the motion complexity and the texture complexity. The lower the motion complexity is, the lower the dynamic frame rate is, and the longer the dynamic image group is. The lower the texture complexity is, the lower the dynamic frame rate is, and the longer the dynamic image group is.

In some embodiments, the encoding information obtaining device 410 is configured to obtain the maximum target bit rate and the minimum target bit rate based on a configuration instruction for bit rates input by a user.

In the several embodiments proposed in the present disclosure, the disclosed systems or methods can be implemented in other ways. For example, the embodiments of systems described above are only illustrative, and the division of devices or units is only a logical functional division. In actual implementation, there may be other division methods, such as multiple devices or units can be combined or integrated into another system, or some features can be ignored or not executed. Here, the coupling or direct coupling or communication connection between each other can be indirect coupling or communication connection through some interfaces, devices, or units, and can be electrical connection, mechanical connection, or other connections.

The devices or units shown as separate components can be physically separated or not. The components shown as devices or units can be physical modules or not. That is, they can be located in one place, or they can also be distributed to multiple network units. Some or all of the devices or units can be selected as needed to achieve the purpose of the corresponding embodiment. For example, in one embodiment of the present disclosure, each functional device or unit can be integrated into one processing device. Each functional device or unit can exist physically separately, or two or more devices or units can be integrated into one device or unit.

The ordinary technical personnel in this field should further realize that the units and algorithm steps of each example described in combination with the embodiments disclosed here can be implemented by electronic hardware, computer software, or a combination of both. In the above description, each example's composition and steps have been described generally based on functions, so as to clearly illustrate the interchangeability of hardware and software. Whether these functions are executed by hardware or software depends on the specific application and design constraints of the technical solution. Professional technicians can use different methods to implement the functions described for each specific situation, but such implementation should not be considered beyond the scope of the present disclosure.

The present disclosure further provides a non-transitory computer-readable storage medium. The non-transitory computer-readable storage medium stores a computer program, and the computer program is executed by a processor to implement an intelligent encoding method according to any one of the embodiments proposed in the present disclosure. Those skilled in the art can understand that, all or part of the steps in the method for implementing the above embodiments can be implemented when the computer program is executed by a processor. The non-transitory computer-readable storage medium may be, for example, random access memory, read-only memory, flash memory, hard disk, solid-state disk, magnetic tape, floppy disk, optical disk and any combination thereof. The above storage medium can be any available medium that can be accessed by a computer, or a data storage device that integrates one or more available media, such as a server, a data center, etc. The available medium can be a magnetic medium (such as a floppy disk, a hard disk, or a magnetic tape), an optical medium (such as a digital video disc), or a semiconductor medium (such as a solid-state disk), etc.

The description of the process or structure corresponding to each of the drawings has different emphases. For the parts that are not detailed in a certain process or structure, reference can be made to the relevant description of other processes or structures.

Figure 5:
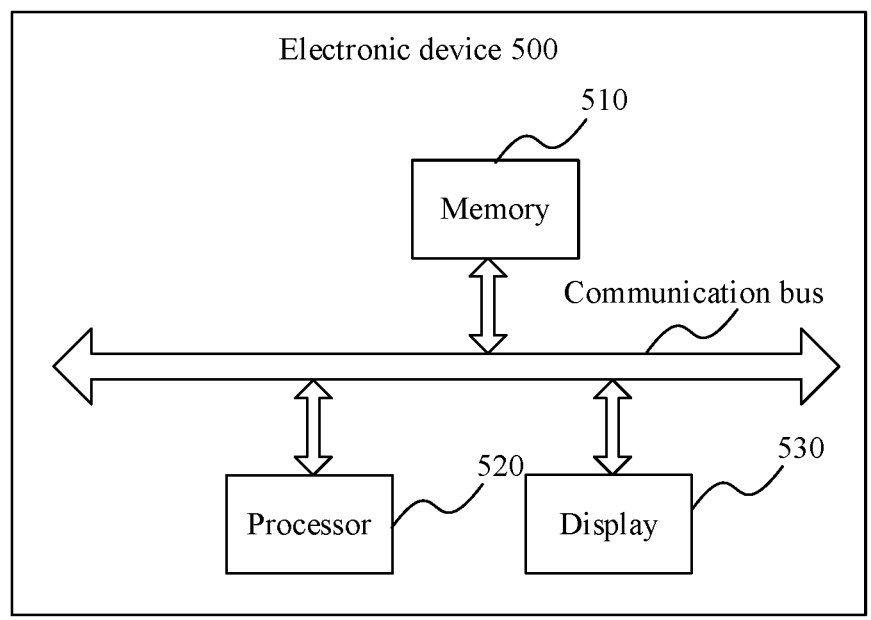
FIG. 5 shows a block diagram of an electronic device according to an embodiment of the present disclosure.

The present disclosure further provides an electronic device. FIG. 5 shows a block diagram of an electronic device 500 according to an embodiment of the present disclosure. As shown in FIG. 5, the electronic device 500 comprises a memory 510 and a processor 520. The memory 510 is configured to store a computer program. The processor 520 is communicatively connected to the memory 510 and configured to call the computer program to perform an intelligent encoding method according to any one of the embodiments in the present disclosure.

In some embodiments, the electronic device 500 may further comprises a display 530. The display 530 is communicatively connected to the memory 510 and the processor 520, and is for displaying a graphical user interface (GUI) related to the intelligent encoding method.

The above-mentioned embodiments are merely illustrative of the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the scope of the present disclosure.

What is claimed is:

1. An intelligent encoding method, comprising:
obtaining intelligent encoding information, wherein the intelligent encoding information comprises a maximum target bit rate, a minimum target bit rate, a motion complexity, a texture complexity, and a region of interest; and
encoding an input source of an encoder based on the intelligent encoding information,
wherein encoding an input source of an encoder based on the intelligent encoding information comprises configuring a dynamic bit rate for the input source of the encoder based on the intelligent encoding information by:
obtaining an encoding coefficient based on the motion complexity, the texture complexity and the region of interest, wherein the encoding coefficient is positively correlated with the motion complexity, the texture complexity, and a dimension of the region of interest; and
configuring a target bit rate of the encoder based on the encoding coefficient, the maximum target bit rate, and the minimum target bit rate.

2. The intelligent encoding method of claim 1, wherein encoding the input source of the encoder based on the intelligent encoding information further comprises:
configuring, based on the intelligent encoding information, at least one of a dynamic frame rate, a dynamic image group, and an effective protection area for the input source of the encoder.

3. The intelligent encoding method of claim 2, wherein configuring the effective protection area for the input source of the encoder based on the intelligent encoding information comprises:
detecting the region of interest from the input source of the encoder; and
configuring an encoding mode of the region of interest as low-quantization parameter encoding, in which a quantization parameter used for encoding the region of interest is smaller than that for a region of non-interest.

4. The intelligent encoding method of claim 2, wherein configuring the dynamic frame rate and the dynamic image group for the input source of the encoder based on the intelligent encoding information comprises:
configuring the dynamic frame rate and the dynamic image group based on the motion complexity and the texture complexity, wherein the lower the motion complexity is, the lower the dynamic frame rate is, and the longer the dynamic image group is, and wherein the lower the texture complexity is, the lower the dynamic frame rate is, and the longer the dynamic image group is.

5. The intelligent encoding method of claim 1, wherein configuring the target bit rate of the encoder based on the encoding coefficient, the maximum target bit rate, and the minimum target bit rate comprises: calculating and configuring the target bit rate of the encoder by using the following formula:

$$target\_bitrate = (max\_bitrate - min\_bitrate) \times ratio + min\_bitrate;$$

wherein target_bitrate indicates the target bit rate of the encoder, max_bitrate indicates the maximum target bit rate, min_bitrate indicates the minimum target bit rate, and ratio indicates the encoding coefficient and ranges from 0 to 1.

6. The intelligent encoding method of claim 1, wherein obtaining the encoding coefficient based on the motion complexity, the texture complexity and the region of interest comprises:
    obtaining the encoding coefficient from an encoding coefficient table, based on the motion complexity, the texture complexity and the region of interest.

7. The intelligent encoding method of claim 1, wherein obtaining the intelligent encoding information comprises:
    obtaining the maximum target bit rate and the minimum target bit rate based on a configuration instruction for bit rates input by a user.

8. An intelligent encoding system, comprising:
    an encoding information obtaining device, configured to obtain intelligent encoding information comprising a maximum target bit rate, a minimum target bit rate, a motion complexity, a texture complexity, and a region of interest; and
    an encoder, configured to encode an input source based on the intelligent encoding information by configuring a dynamic bit rate for the input source of the encoder based on the intelligent encoding information by:
        obtaining an encoding coefficient based on the motion complexity, the texture complexity and the region of interest, wherein the encoding coefficient is positively correlated with the motion complexity, the texture complexity, and a dimension of the region of interest; and
        configuring a target bit rate of the encoder based on the encoding coefficient, the maximum target bit rate, and the minimum target bit rate.

9. The intelligent encoding system of claim 8, wherein the encoder is further configured to:
    configure, based on the intelligent encoding information, at least one of, a dynamic frame rate, a dynamic image group, and an effective protection area for the input source of the encoder.

10. The intelligent encoding system of claim 9, wherein the encoder is configured to:
    detect the region of interest from the input source of the encoder; and
    configure an encoding mode of the region of interest as low-quantization parameter encoding.

11. The intelligent encoding system of claim 9, wherein the encoder is configured to:
    configure the dynamic frame rate and the dynamic image group based on the motion complexity and the texture complexity, wherein the lower the motion complexity is, the lower the dynamic frame rate is, and the longer the dynamic image group is, and wherein the lower the texture complexity is, the lower the dynamic frame rate is, and the longer the dynamic image group is.

12. The intelligent encoding system of claim 8, wherein the encoder is configured to: calculate and configure the target bit rate of the encoder by using the following formula:

$$\text{target\_bitrate} = (\text{max\_bitrate} - \text{min\_bitrate}) \times \text{ratio} + \text{min\_bitrate};$$

wherein target_bitrate indicates the target bit rate of the encoder, max_bitrate indicates the maximum target bit rate, min_bitrate indicates the minimum target bit rate, and ratio indicates the encoding coefficient and ranges from 0 to 1.

13. The intelligent encoding system of claim 8, wherein the encoder is configured to:
    obtain the encoding coefficient from an encoding coefficient table, based on the motion complexity, the texture complexity and the region of interest.

14. The intelligent encoding system of claim 8, wherein the encoding information obtaining device is configured to:
    obtain the maximum target bit rate and the minimum target bit rate based on a configuration instruction for bit rates input by a user.

15. An electronic device, comprising:
    a memory, configured to store a computer program; and
    a processor, configured to execute the computer program to:
    obtain intelligent encoding information, wherein the intelligent encoding information comprises a maximum target bit rate, a minimum target bit rate, a motion complexity, a texture complexity, and a region of interest; and
    encode an input source based on the intelligent encoding information by:
        obtaining an encoding coefficient based on the motion complexity, the texture complexity and the region of interest, wherein the encoding coefficient is positively correlated with the motion complexity, the texture complexity, and a dimension of the region of interest; and
        configuring the dynamic bit rate based on the encoding coefficient, the maximum target bit rate, and the minimum target bit rate.

16. The electronic device of claim 15, wherein the processor is further configured to execute the computer program to:
    configure, based on the intelligent encoding information, at least one of a dynamic frame rate, a dynamic image group, and an effective protection area for the input source.

17. The electronic device of claim 16, wherein the processor is configured to execute the computer program to:
    configure the dynamic frame rate and the dynamic image group based on the motion complexity and the texture complexity, wherein the lower the motion complexity is, the lower the dynamic frame rate is, and the longer the dynamic image group is, and wherein the lower the texture complexity is, the lower the dynamic frame rate is, and the longer the dynamic image group is.

* * * * *